(12) United States Patent
Shibata

(10) Patent No.: US 6,268,866 B1
(45) Date of Patent: Jul. 31, 2001

(54) DIGITAL WATERMARKING SYSTEM FOR MAKING A DIGITAL WATERMARK WITH FEW COLORS OF INPUT IMAGE

(75) Inventor: Naoki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/099,524

(22) Filed: Jun. 18, 1998

(30) Foreign Application Priority Data

Jun. 18, 1997 (JP) ................................... 9-160722

(51) Int. Cl.$^7$ ................................... G06T 11/40
(52) U.S. Cl. ................... 345/430; 345/431; 345/432; 345/429; 380/54
(58) Field of Search .................. 345/430, 431, 345/429, 432; 380/54, 51

(56) References Cited

U.S. PATENT DOCUMENTS

| | | | |
|---|---|---|---|
| 5,530,759 | * 6/1996 | Braudaway et al. | 380/54 |
| 5,586,234 | * 12/1996 | Sakuraba et al. | 395/130 |
| 5,825,892 | * 10/1998 | Braudaway et al. | 380/51 |
| 5,870,101 | * 2/1999 | Murata et al. | 345/430 |
| 5,875,249 | * 2/1999 | Mintzer et al. | 380/54 |
| 5,915,027 | * 6/1999 | Cox et al. | 380/54 |
| 5,930,369 | * 7/1999 | Cox et al. | 380/54 |

FOREIGN PATENT DOCUMENTS

95/14289   5/1995  (WO).

* cited by examiner

*Primary Examiner*—Matthew Luu
*Assistant Examiner*—Daniel J Chung
(74) *Attorney, Agent, or Firm*—Foley & Lardner

(57) ABSTRACT

A digital watermarking system capable of making a digital watermark even in an input image of few colors. An image input section inputs an object image in which a digital watermark is to be made and transforms or develops the image into digital data of the format of the system. In a texture database section, texture patterns in each of which the digital watermark is previously made are registered. And in a color conversion table section, information for coordinating original colors used in the input image with the textures is registered. An image composing section creates a watermarked image in which the original colors of the input image are replaced with the textures of the texture database as designated in the color conversion table. An image output section retains the watermarked image to be outputted from the image composing section and outputs the watermarked image.

22 Claims, 6 Drawing Sheets

DIGITAL WATERMARKING SYSTEM FOR MAKING A DIGITAL WATERMARK WITH FEW COLORS OF INPUT IMAGE

BACKGROUND OF THE INVENTION

1. Field of the Invention

The present invention relates to a digital watermarking system, and more particularly to a digital watermarking system for making a digital watermark in an image signal.

2. Description of the Related Art

As demands for protection of the copyright of contents of image signals have been on the rise in today's computer age, and yet as an exemplified technology for embedding descriptive information in signals of the media, development of the technology called "digital watermarking" has been carried forward. Generally, watermarking for image is regarded as a technology of modifying the image signal or data in such a form as to be impossible or extremely difficult to recognize by the human's peculiar visual sense.

The digital watermarking technology is exemplified by International Laid-Open Patent No. WO95-14289 disclosing a concept of combining a certain number of noise screens distributed at random in space regions and superimposing the composite a noise screen with an original image.

Further, in their copending U.S. patent application Ser. No. 08/534,894, the present applicant has proposed a digital watermarking technology of transforming an input image into frequency regions, then modifying part of the spectrum to make a digital watermark and then reversely transforming the frequency regions into the image (space regions).

In this last-named technology, the original image is transformed into frequency domain data using Fourier formation or DCT (discrete cosine transform), whereupon a significant value in the resulting spectrum is selected. The significant value means a value influential on the original image when the data is modified or deleted; this significant value is discriminated using, for example, the absolute value of the spectrum as a reference.

The selected absolute value of the spectrum is multiplied by $(1+\alpha)$ where $\alpha$ is a random number whose upper limit is approximately 0.1; the value of this random number and the position of the spectrum jointly define a digital watermark. Then the modified spectrum is transformed by reverse Fourier transform or reverse DCT to obtain a digital-watermarked image.

This method merely intends to weaken a digital watermark down to such a level not to be recognized by the human's visual sense, utilizing the lengthy depth of luminance level of the image.

According to the conventional technology, if the original image has few colors like, for example, a map image, it is impossible to make a digital watermark in such image data if not modified. Yet if a digital watermark could be made in the unmodified image data, the original image would have been greatly collapsed.

If the format of the image is transformed to secure an adequate luminance level, e.g., if the image of total eight colors represented by 3 bits of RGB (Red, Green, Blue) is transformed into an 24-bit image represented by 8 bits each of RGB with the hue kept unchanged, it is possible to secure such a depth of luminance level that a digital watermark can be made in the image. However, it would be possible to assume the primary colors of the original image; that is, the digital watermark can be deleted as by performing a simple quantification of color.

SUMMARY OF THE INVENTION

With the foregoing problems in view, an object of the present invention is to provide a digital watermarking system which is capable of effectively making a digital watermark in an original image of few colors.

According to a first aspect of the invention, the above object is accomplished by a digital watermarking system for making a digital watermark in an input image, comprising: a texture database previously containing a plurality of texture patterns in each of which the digital watermark is previously made; a color conversion table in which information for coordinating original colors of the input image with the texture patterns is previously registered; means for composing, based on contents of the textured base and of the color conversion table, a watermarked image in which the original colors of the input image are replaced with the corresponding texture patterns; and outputting means for retaining the watermarked image received from the composing means and outputting the watermarked image.

According to a second aspect of the invention, there is provided a digital watermarking system for making a digital watermark in an input image, comprising: a texture database previously containing a plurality of textured patterns; a color conversion table in which information for coordinating colors of the input image with the textured patterns is previously registered; watermarking means for making the digital watermark in each of the texture patterns received from the texture database; means for composing, based on contents of the color conversion table and an output of the watermarking means, a watermarked image in which the original colors of the input image are replaced with the corresponding watermarked texture patterns; and outputting means for retaining the watermarked image received from the composing means and for outputting the watermarked image.

According to a third aspect of the invention, there is provided a digital watermarking system for making a digital watermark in an input image, comprising: a texture database previously containing a plurality of texture patterns; a color conversion table in which information for coordinating original colors used in the input image with the texture patterns is registered; means for composing, based on contents of the texture database and of the color conversion table, a composite image in which the original colors of the input image are replaced with the corresponding texture patterns; watermarking means for making a digital watermark in the composite image to be outputted from the composing means; and outputting means for retaining the composite image in which the watermark is made by the watermarking means and for outputting such watermarked image.

According to a fourth aspect of the invention, there is provided a digital watermarking system for making a digital watermark in an input image, comprising: a texture database previously containing a plurality of texture patterns; a color conversion table in which information for coordinating original colors used in the input image with the texture patterns; a plurality of image buffers one for holding each of the texture patterns corresponding to a respective one of the original colors of the input image; watermarking means for making the digital watermark in each of the texture patterns held respectively by the image buffers; means for detecting the original colors of the input image one for each pixel of the input image; composing means for reading, from the image buffers corresponding to the original colors detected one for each pixel of the input image by the detecting means and holding the watermarked texture patterns, the corresponding pixels and for composing a composite image in which the original colors of the input image are replaced with the corresponding texture patterns; and outputting means for retaining the composite image outputted from the composing means and for outputting the composite image.

With the digital watermarking system of the invention, it is possible to make a digital watermark even in an input image of few colors at an adequately invisible level by increasing the depth of luminance level or of number of colors.

In the present invention, partly since the format of the image data is extended merely in depth of level and partly since the same color region of the original image is transformed into a region having a specified pattern of texture such that reproduction of the original image by performing color quantification again is difficult to achieve, it is possible to improve the resistance to requantization of color.

Preferably, the texture has many colors or varies in luminance level, so that a digital watermark can be made in an input image of few colors and the resistance to deleting the digital watermark by requantization of color can be improved.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The principles of the present invention are particularly useful when applied to a digital watermarking system, various embodiments of which will now be described in detail with reference to the accompanying drawings.

Figure 1:
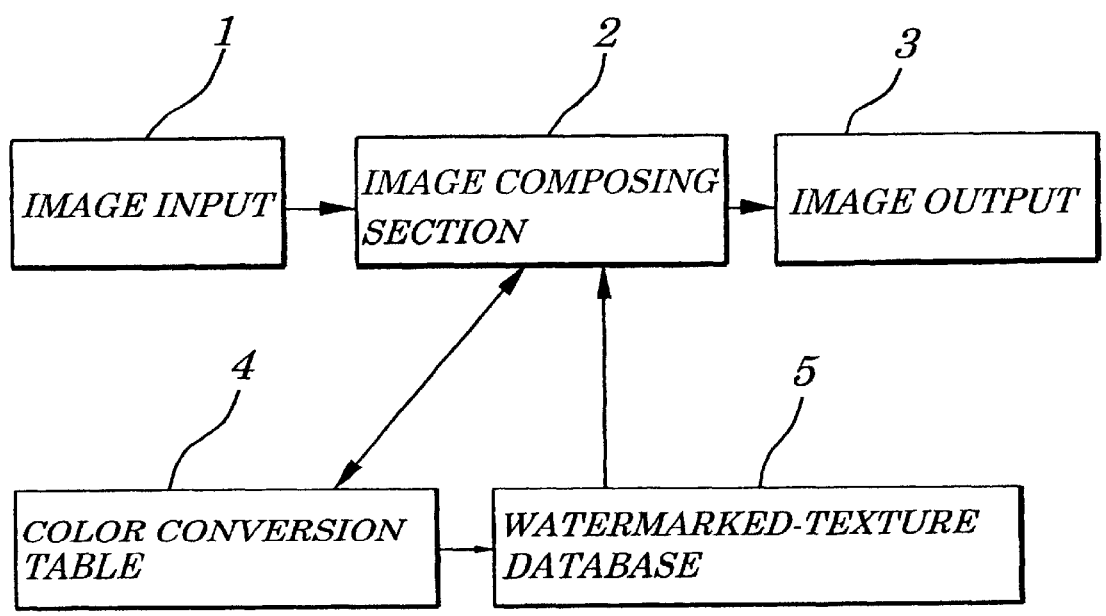
FIG. 1 is a block diagram showing a digital watermarking system according to a first embodiment of the invention.

FIG. 1 is a block diagram showing a digital watermarking system (hereinafter also called the system) according to a first embodiment. As shown in FIG. 1, the system comprises an image input section 1, an image composing section 2, an image output section 3, a color conversion table 4, and a texture database section (hereinafter called the database section) 5. Each of these sections can be realized by combining a program and an input means of a necessary input sensor (i.e., an image scanner) using a micro CPU (central processing unit) or a DSP (digital signal processor).

The image input section 1 inputs an object image in which a digital watermark is to be made. Using the information from an image scanner or a CD-ROM or floppy disk drive, the image input section 1 transforms or develops the data of the input image into digital data of the type used in the system.

This development is a process required to the compression format as of JPEG (joint photographic experts group) or GIF (graphics interchange format).

The data of the type used in the system has independent planes as of R (red), G (green) and B (blue) and is of a type in which luminance values of pixels of the individual colors are contained.

The image of total eight colors represented by 3 bits of RGB (red, green, blue) may be transformed into a 24-bit image whose RGB are each represented by 8 bits, with the hue kept unchanged. By this transforming, it is possible to extend the depth of luminance level or of number of colors.

In the database section 5, a plurality of texture patterns in each of which a digital watermark is previously made are registered; a certain size of texture image is registered in the format used in the system, prior to the digital watermarking.

The color conversion table section 4 is a table for coordinating the original colors used in the image input to the image input section 1 with a texture of the textures registered in the database section 5, namely, a table in which information for coordinating the colors used in the input image with the textures is registered.

The color conversion table section 4 may be realized as two-dimensional array data in a memory by, for example, a micro CPU or a DSP (digital signal processor). The coordinative information is given by the user at the start of making a digital watermark.

The manner for giving such coordinative information to the color conversion table section 4 is exemplified by a method of writing combinations of RGB directly in the memory as colors of the input image and writing serial numbers, which are registered in the database section 5, directly in the memory as designation of the textures, and a method of writing these data in the memory using a GUI (graphical user interface). Each of the RGB combinations may be a combination of pseudo random numbers; the method of designating such combination is not the subject of the invention, so its description is omitted here.

The image composing section 2 synthesizes or composes a composite image in which the original colors used in the image inputted by the image input section 1 are replaced with one of the textures, which are registered in the database section 5, as designated in accordance with the color conversion table section 4.

The image output section 3 retains the composite image received from the image composing section 2 in any form and then outputs the retained composite image. Specifically, the image output section 3 retains the output of the image composing section 2 as a file on the floppy disk or hard disk or as data on a reclaimable memory and outputs such file or data by displaying on a display screen or printing on a printer.

Figure 2:
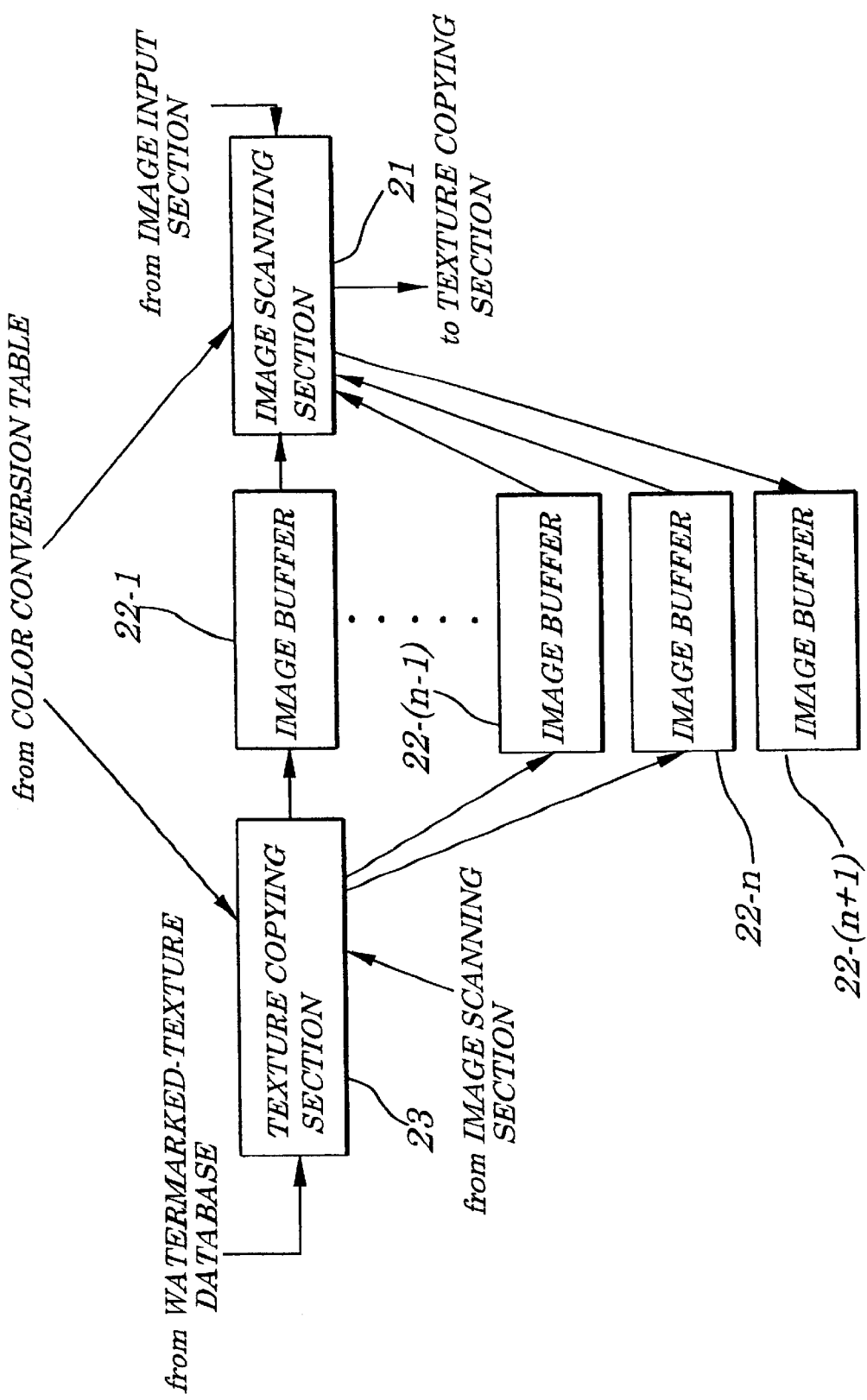
FIG. 2 is a block diagram showing an image composing section of the system of FIG. 1.

FIG. 2 is a block diagram showing the detailed structure of the image composing section 2 of FIG. 1. As shown in FIG. 2, the image composing section 2 is composed of an image scanning section 21, a plurality of image buffers 22-1 to 22-(n+1), and a texture copying section 23. If the number of object images in which digital watermarks are to be made is n, (n+1) number of the image buffers also are required.

In the color conversion table section 4, coordination between the colors and the textures is designated prior to the composing operation of the image composing section 2. The image scanning section 21 firstly checks the size (the number of pixels) of the image inputted by the image input section 1 and then transfers the checked size to the texture copying section 23 where a copying operation is performed.

Referring to the contents of the color conversion table section 4 from its head, the texture copying section 23 copies the digital-watermarked textures, which are received from the data base section 6, successively into the image buffer 22-1. At that time, if the size of previously prepared textures is not equal to the size of the object image in which a digital watermark is to be made, the texture copying section 23 performs, based on the image size received from the image scanning section 21, the following operation.

Namely, if the width and/or length of the image size is larger than the size of the corresponding dimension of the texture, the texture copying section 23 repeatedly copies the texture with respect to the direction of that dimension. And if it is smaller, the texture copying section 23 copies part of the texture, e.g., a necessary length from the left or upper end of the texture.

Upon termination of copying of a corresponding one of the textures registered in the color conversion table section 4, the texture copying section 23 copies the texture onto the next image buffer 22-2 with respect to the next coordination in the color conversion table section 4, repeating this copying operation until the last coordination in the color conversion table section 4. And the image scanning section 21 restarts scanning after termination of this copying operation.

After termination of the copying operation of the texture copying section 23, the image scanning section 21 successively scans the pixels of the image input to the image input section 1. The image scanning section 21 scans the whole pixels of the input image, irrespective of whether the scanning is made spirally or from the left upper end to the right lower end.

When the image scanning section 21 scans a single pixel and obtains color information of that pixel, it consults with the color conversion table section 4 based on the color information, then reads the corresponding pixel from a corresponding one of the image buffers 22-1 to 22-n and copies that pixel onto the image buffer 22-(n+1).

When the image scanning section 21 has completed scanning of the entire image inputted by the image input section 1, a composite image in which color information is replaced with the texture image is retained in the image buffer 22-(n+1) as the output of the image composing section 2.

The operation of the digital watermarking system of the first embodiment will now be described using FIGS. 1 and 2.

Prior to the digital watermarking operation, the digital-watermarked texture data is previously registered in the database section 5 by the user or the manufacturer. Alternatively, the user prepares, in the image input section 1, an image in which a digital watermark is to be made and previously designates, in the color conversion table section 4, coordination between the original colors used in the image and the textures.

As the digital watermarking operation is started, the image composing section 2 composes, based on the coordination between the colors and textures which coordination is designated in the color conversion table section 4, a composite image in which the color pixels are replaced with the textures of the database section 5. Upon receipt of the output of the image composing section 2, the image output section 3 retains the received composite image and then outputs it by displaying on the display screen or by printing using a printer.

Figure 3:
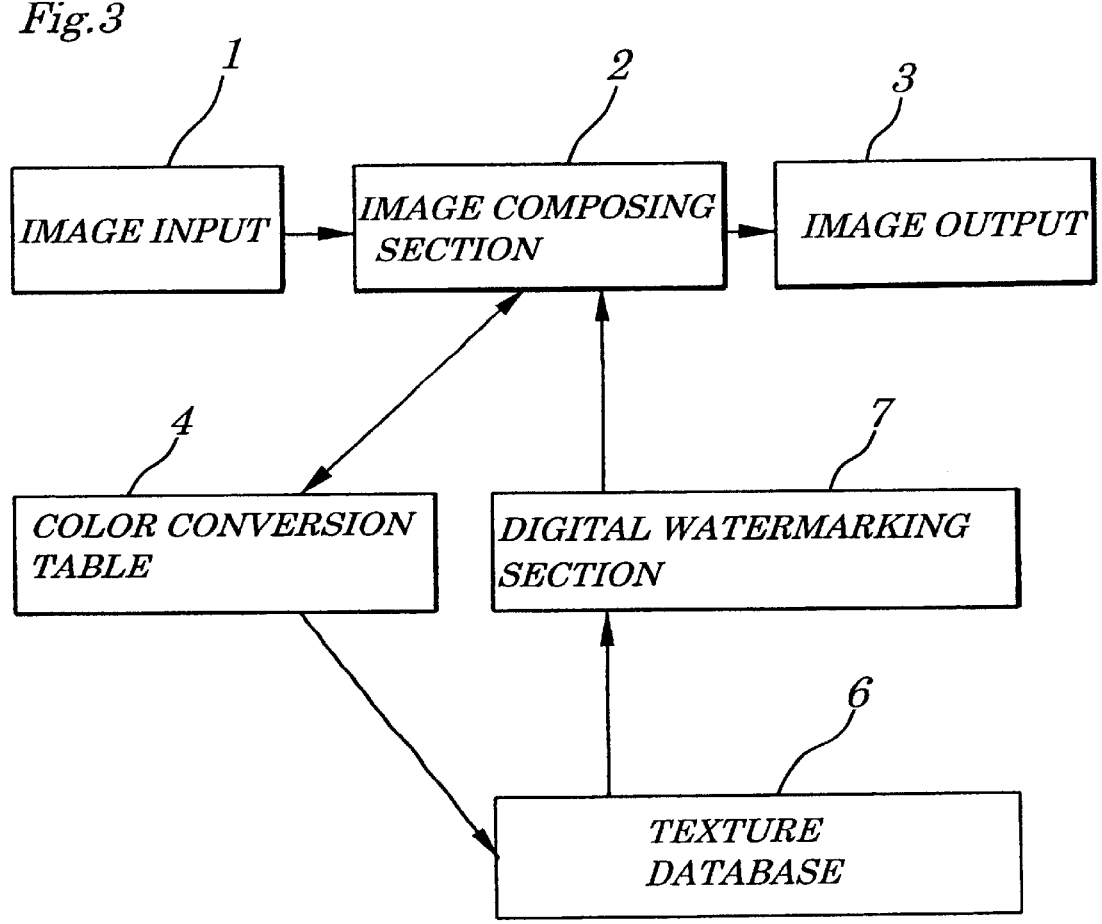
FIG. 3 is a block diagram showing a digital watermarking system according to a second embodiment of the invention.

FIG. 3 is a block diagram showing a digital watermarking system according to a second embodiment. As shown in FIG. 3, the system of this embodiment is identical in construction with that of the first embodiment except that the watermarked-texture database section 5, in which the watermarked textures are previously registered, is substituted by a watermark-free-texture database section (hereinafter also called the database section) 6, in which unwatermarked textures are previously registered, and a digital watermarking section 7. Elements or parts similar in construction and function to those of the first embodiment are designated by the same reference numbers.

Each of constituent sections of the system of this embodiment may be realized by combining a program and an input means in the form of an input sensor (e.g. an image scanner) using a micro CPU or a DSP (digital signal processor).

In the database section 6, a plurality of predetermined texture patterns are previously registered; a certain size of texture image is registered in the format used in this system, prior to the digital watermarking operation.

The color conversion table section 4 is a table for coordinating the original colors used in the image input to the image input section 1 with a texture of the textures registered in the database section 6, namely, a table in which information for coordinating the colors used in the input image with the textures is registered.

The color conversion table section 4 may be realized as two-dimensional array data in a memory by, for example, a micro CPU or a DSP (digital signal processor). The coordinative information is given by the user at the start of making a digital watermark.

The manner for giving such coordinative information to the color conversion table section 4 is exemplified by a method of writing combinations of RGB directly in the memory as colors of the input image and writing serial numbers, which are registered in the database section 6, directly in the memory as designation of the textures, and a method of writing these data in the memory using a GUI (graphical user interface). Each of the RGB combinations may be a combination of pseudo random numbers; the method of designating such combination is not the subject of the invention, so its description is omitted here.

The digital watermarking section 7 makes a digital watermark in a texture read from the data base section 6 in accordance with the coordination of the color conversion table section and then outputs the watermarked texture to the image composing section 2.

The image composing section 2 synthesizes or composes a composite image in which the original colors used in the image inputted by the image input section 1 are replaced with one of the textures, which are registered in the database section 6, by the digital watermarking section 7.

The image composing section 2 of the system of this embodiment is similar in construction to that of the first embodiment. In the image composing section 2, an image scanning section 21 firstly detects the size (i.e. the number of pixels) of the image inputted by the image input section 1 and then transfers that size to a texture copying section 23 where the copying operation is performed.

Referring to the contents of the color conversion table section 4 from its head, the texture copying section 23 copies the digital-watermarked textures, which are received from the data base section 6, successively from the image buffer 22-1. At that time, if the size of previously prepared textures is not equal to the size of the object image in which a digital watermark is to be made, the texture copying section 23 performs, based on the image size received from the image scanning section 21, the following operation.

Namely, if the width and/or length of the image size is larger than the size of the corresponding dimension of the texture, the texture copying section 23 repeatedly copies the texture with respect to the direction of that dimension. And if it is smaller, the texture copying section 23 copies part of the texture, e.g., a necessary length from the left or upper end of the texture.

Upon termination of copying of a corresponding one of the textures registered in the color conversion table section 4, the texture copying section 23 copies the texture onto the next image buffer 22-2 (not shown) with respect to the next coordination in the color conversion table section 4, repeating this copying operation until the last coordination in the color conversion table section 4. And the image scanning section 21 restarts scanning after termination of this copying operation.

After termination of the copying operation of the texture copying section 23, the image scanning section 21 successively scans the pixels of the image input to the image input section 1. The image scanning section 21 scans the whole pixels of the input image, irrespective of whether the scanning is made spirally or from the left upper end to the right lower end.

When the image scanning section 21 scans a single pixel and obtains color information of that pixel, it consults with the color conversion table section 4 based on the color information, then reads the corresponding pixel from a corresponding one of the image buffers 22-1 to 22-n and copies that pixel onto the image buffer 22-(n+1).

When the image scanning section 21 has completed scanning of the entire image inputted by the image input section 1, a composite image in which color information is replaced with the texture image is retained in the image buffer 22-(n+1) as the output of the image composing section 2.

The image output section 3 retains the composite image received from the image composing section 2 in any form and then outputs the retained composite image. Specifically, the image output section 3 retains the output of the image composing section 2 as a file on the floppy disk or hard disk or as data on a reclaimable memory and outputs such file or data by displaying on a display screen or printing on a printer.

The operation of the digital watermarking system of the second embodiment will now be described using FIGS. 2 and 3.

Prior to the digital watermarking operation, the watermark-free texture data is previously registered in the database section 6 by the user or the manufacturer. Alternatively, the user prepares, in the image input section 1, an image in which a digital watermark is to be made and previously designates, in the color conversion table section 4, coordination between the original colors used in the image and the textures.

As the digital watermarking operation is started, the image composing section 2 composes, based on the coordination between the colors and textures which coordination is designated in the color conversion table section 4, a composite image in which the color pixels are replaced with the textures, which are read from the database section 6 and in which the digital watermark is previously made by the digital watermarking section 7. In the image composing section 2, the textures read from the data base section 6 are transferred to the image composing section 2 via the digital watermarking section 7 where a composite image in which the image inputted by the image input section 1 is replaced with those watermarked textures is composed. Upon receipt of the output of the image composing section 2, the image output section 3 retains the received composite image and then outputs it by displaying on the display screen or by printing using a printer.

Figure 4:
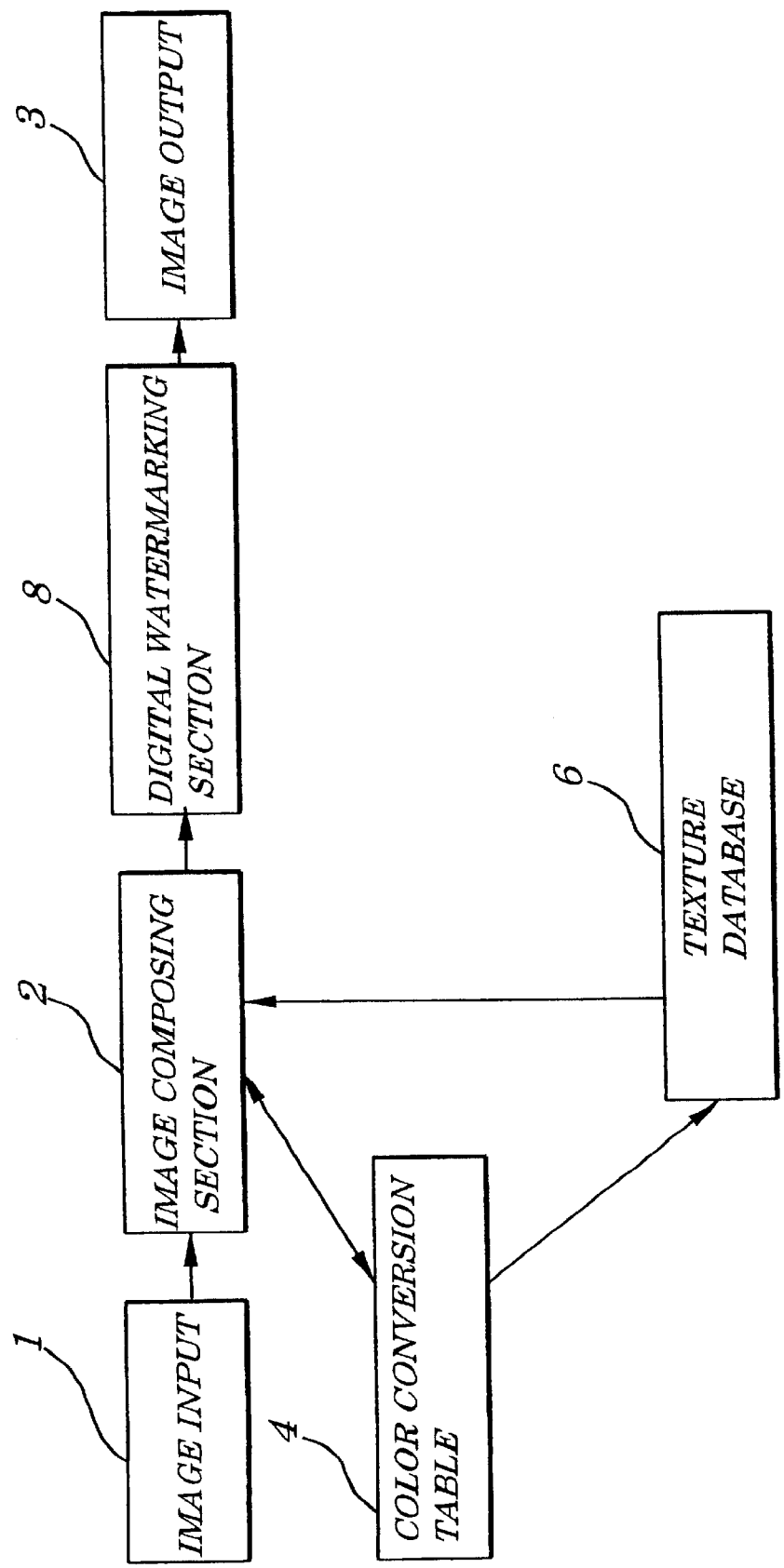
FIG. 4 is a block diagram showing a digital watermarking system according to a third embodiment of the invention.

FIG. 4 is a block diagram showing a digital watermarking system according to a third embodiment. As shown in FIG. 4, the system of this embodiment is identical in construction with that of the first embodiment except that the watermarked-texture database section 5, in which the watermarked textures are previously registered, is substituted by a watermark-free-texture database section (hereinafter also called the database section) 6, in which watermarked textures are previously registered, and a digital watermarking section 8. Elements or parts similar in construction and function to those of the first embodiment are designated by the same reference numbers.

Each of constituent sections of the system of this embodiment may be realized by combining a program and an input means in the form of an input sensor (e.g. an image scanner) using a micro CPU or a DSP (digital signal processor).

In the database section 6, a plurality of predetermined texture patterns are previously registered; a certain size of texture image is registered in the format used in this system, prior to the digital watermarking operation.

The color conversion table section 4 is a table for coordinating the original colors used in the image input to the image input section 1 with a texture of the textures registered in the database section 6, namely, a table in which information for coordinating the colors used in the input image with the textures is registered.

The color conversion table section 4 may be realized as two-dimensional array data in a memory by, for example, a micro CPU or a DSP (digital signal processor). The coordinative information is given by the user at the start of making a digital watermark.

The manner for giving such coordinative information to the color conversion table section 4 is exemplified by a method of writing combinations of RGB directly in the memory as colors of the input image and writing serial numbers, which are registered in the database section 6, directly in the memory as designation of the textures, and a method of writing these data in the memory using a GUI (graphical user interface). Each of the RGB combinations may be a combination of pseudo random numbers; the method of designating such combination is not the subject of the invention, so its description is omitted here.

The image composing section 2 synthesizes or composes a composite image in which the original colors used in the image inputted by the image input section 1 are replaced with one of the textures, which are registered in the database section 6, as designation by the color conversion table section 4.

The image composing section 2 of the system of this embodiment is similar in construction to that of the first embodiment. In the image composing section 2, an image scanning section 21 firstly detects the size (i.e. the number of pixels) of the image inputted by the image input section 1 and then transfers that size to a texture copying section 23 where the copying operation is performed.

Referring to the contents of the color conversion table section 4 from its head, the texture copying section 23 copies the digital-watermarked textures, which are received from the data base section 6, successively from the image buffer 22-1. At that time, if the size of previously prepared textures is not equal to the size of the object image in which a digital watermark is to be made, the texture copying section 23 performs, based on the image size received from the image scanning section 21, the following operation.

Namely, if the width and/or length of the image size is larger than the size of the corresponding dimension of the texture, the texture copying section 23 repeatedly copies the texture with respect to the direction of that dimension. And if it is smaller, the texture copying section 23 copies part of the texture, e.g., a necessary length from the left or upper end of the texture.

Upon termination of copying of a corresponding one of the textures registered in the color conversion table section 4, the texture copying section 23 copies the texture onto the next image buffer 22-2 (not shown) with respect to the next coordination in the color conversion table section 4, repeating this copying operation until the last coordination in the color conversion table section 4. And the image scanning section 21 restarts scanning after termination of this copying operation.

After termination of the copying operation of the texture copying section 23, the image scanning section 21 successively scans the pixels of the image input to the image input section 1. The image scanning section 21 scans the whole pixels of the input image, irrespective of whether the scanning is made spirally or from the left upper end to the right lower end.

When the image scanning section 21 scans a single pixel and obtains color information of that pixel, it consults with the color conversion table section 4 based on the color information, then reads the corresponding pixel from a corresponding one of the image buffers 22-1 to 22-n and copies that pixel onto the image buffer 22-(n+1).

When the image scanning section 21 has completed scanning of the entire image inputted by the image input section 1, a composite image in which color information is replaced with the texture image is retained in the image buffer 22-(n+1) as the output of the image composing section 2.

The image output section 3 retains the composite image received from the image composing section 2 in any form and then outputs the retained composite image. Specifically, the image output section 3 retains the output of the image composing section 2 as a file on the floppy disk or hard disk or as data on a reclaimable memory and outputs such file or data by displaying on a display screen or printing on a printer.

The operation of the digital watermarking system of the third embodiment will now be described using FIGS. 2 and 4.

Prior to the digital watermarking operation, the watermark-free texture data is previously registered in the database section 6 by the user or the manufacturer. Alternatively, the user prepares, in the image input section 1, an image in which a digital watermark is to be made and previously designates, in the color conversion table section 4, coordination between the original colors used in the input image and the textures.

As the digital watermarking operation is started, the image composing section 2 composes, based on the coordination between the colors and textures which coordination is designated in the color conversion table section 4, a composite image in which the color pixels are replaced with the textures, which are read from the database section 6.

As the digital-watermark composing operation of the image composing section 2 is started, the digital watermarking section 8 makes a digital watermark in the output of the image composing section 2 and outputs the watermarked output to the image output section 3. Upon receipt of the watermarked output from the digital watermarking section 8, the image output section 3 retains the received composite image and then outputs it by displaying on the display screen or by printing using a printer.

Figure 5:
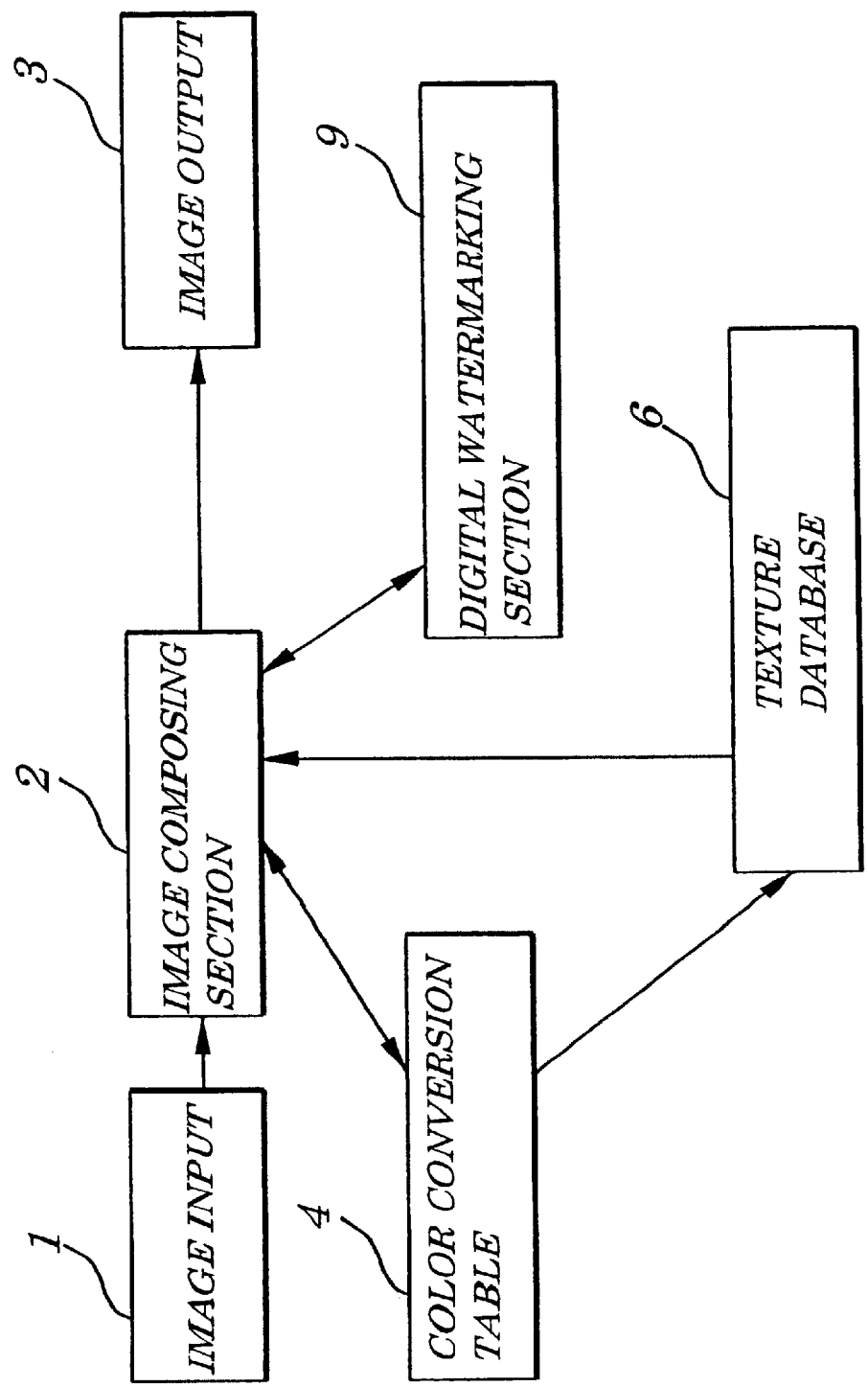
FIG. 5 is a block diagram showing a digital watermarking system according to a fourth embodiment of the invention.

FIG. 5 is a block diagram showing a digital watermarking system according to a second embodiment. As shown in FIG. 5, the system of this embodiment is identical in construction with that of the first embodiment except that the watermarked-texture database section 5, in which the watermarked textures are previously registered, is substituted by a watermark-free-texture database section (hereinafter also called the database section) 6, in which unwatermarked textures are previously registered, and a digital watermarking section 9. Elements or parts similar in construction and function to those of the first embodiment are designated by the same reference numbers.

In the database section 6, a plurality of predetermined texture patterns are previously registered; a certain size of texture image is registered in the format used in this system, prior to the digital watermarking operation.

The color conversion table section 4 is a table for coordinating the original colors used in the image input to the image input section 1 with a texture of the textures registered in the database section 6, namely, a table in which information for coordinating the colors used in the input image with the textures is registered.

The color conversion table section 4 may be realized as two-dimensional array data in a memory by, for example, a micro CPU or a DSP (digital signal processor). The coordinative information is given by the user at the start of making a digital watermark.

The manner for giving such coordinative information to the color conversion table section 4 is exemplified by a method of writing combinations of RGB directly in the memory as colors of the input image and writing serial numbers, which are registered in the database section 6, directly in the memory as designation of the textures, and a method of writing these data in the memory using a GUI (graphical user interface). Each of the RGB combinations may be a combination of pseudo random numbers; the method of designating such combination is not the subject of the invention, so its description is omitted here.

The digital watermarking section 7 makes a digital watermark in a texture read from the data base section 6 in accordance with the coordination of the color conversion table section and then outputs the watermarked texture to the image composing section 2.

The image output section 3 retains the composite image received from the image composing section 2 in any form and then outputs the retained composite image. Specifically, the image output section 3 retains the output of the image composing section 2 as a file on the floppy disk or hard disk or as data on a reclaimable memory and outputs such file or data by displaying on a display screen or printing on a printer.

Figure 6:
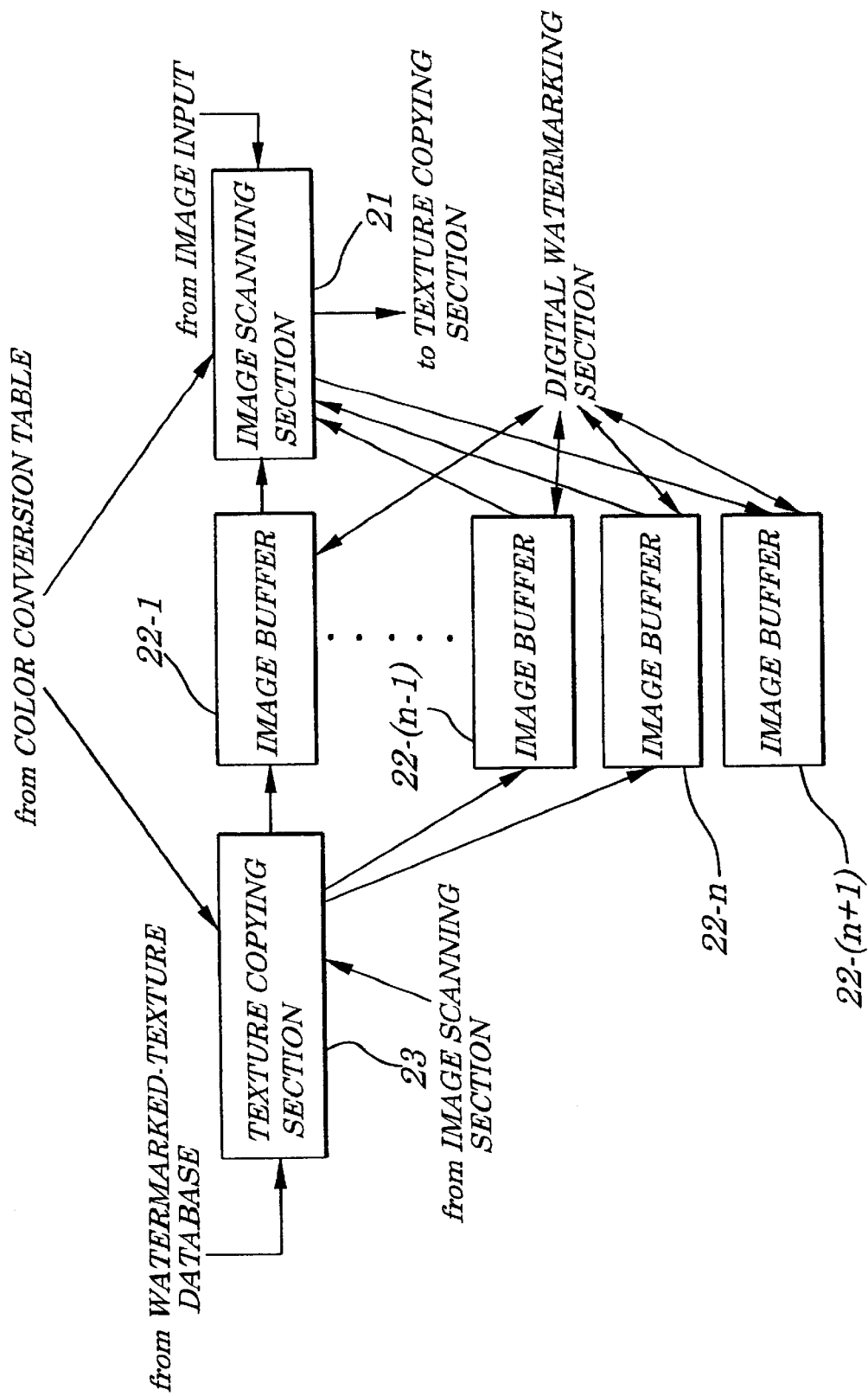
FIG. 6 is a block diagram showing an image composing section of the system of FIG. 5.

FIG. 6 is a block diagram showing the detailed structure of the image composing section 2 of FIG. 1. As shown in FIG. 6, the image composing section 2 is composed of an image scanning section 21, a plurality of image buffers 22-1 to 22-(n+1), and a texture copying section 23. If the number of object images in which digital watermarks are to be made is n, (n+1) number of the image buffers also are required.

In the color conversion table section 4, coordination between the colors and the textures is designated prior to the composing operation of the image composing section 2. The image scanning section 21 firstly checks the size (the number of pixels) of the image inputted by the image input section 1 and then transfers the checked size to the texture copying section 23 where a copying operation is performed.

Referring to the contents of the color conversion table section 4 from its head, the texture copying section 23 copies the digital-watermarked textures, which are received from the data base section 6, successively from the image buffer 22-1. At that time, if the size of previously prepared textures is not equal to the size of the object image in which a digital watermark is to be made, the texture copying section 23 performs, based on the image size received from the image scanning section 21, the following operation.

Namely, if the width and/or length of the image size is larger than the size of the corresponding dimension of the texture, the texture copying section 23 repeatedly copies the texture with respect to the direction of that dimension. And if it is smaller, the texture copying section 23 copies part of the texture, e.g., a necessary length from the left or upper end of the texture.

Upon termination of copying of a corresponding one of the textures registered in the color conversion table section 4, the texture copying section 23 copies the texture onto the next image buffer 22-2 (not shown) with respect to the next coordination in the color conversion table section 4, repeating this copying operation until the last coordination in the color conversion table section 4. And the image scanning section 21 makes a digital watermark in the image of each of the image buffers 22-1 to 22-n using the digital watermarking section 9.

After termination of the watermarking operation of the digital watermarking section 9, the image scanning section 21 successively scans the pixels of the image input by the image input section 1. The image scanning section 21 scans the whole pixels of the input image, irrespective of whether the scanning is made spirally or from the left upper end to the right lower end.

When the image scanning section 21 scans a single pixel and obtains color information of that pixel, it consults with the color conversion table section 4 based on the color information, then reads the corresponding pixel from a corresponding one of the image buffers 22-1 to 22-n and copies that pixel onto the image buffer 22-(n+1).

When the image scanning section 21 has completed scanning of the entire image inputted by the image input section 1, a composite image in which color information is replaced with the texture image is retained in the image buffer 22-(n+1) as the output of the image composing section 2.

The operation of the digital watermarking system of the third embodiment will now be described using FIGS. 2 and 4.

Prior to the digital watermarking operation, the watermark-free texture data is previously registered in the database section 6 by the user or the manufacturer. Alternatively, the user prepares, in the image input section 1, an image in which a digital watermark is to be made and previously designates, in the color conversion table section 4, coordination between the original colors used in the input image and the textures.

As the digital-watermark composing operation is started, the digital watermarking section 2 makes a digital watermark in the image inputted by the image input section 1 and composes a composite image in which the colors of the input image are replaced with the textures read from the data base section 6, based on the coordination between the colors of the input image and the textures as designated by the color conversion table section 4. Upon termination of the image composing operation of the image composing section 2, the digital watermarking section 9 inputs the image stored in the image buffers 22-1 to 22-n of the image composing section 2 and, makes a digital watermark in that image and outputs an watermarked image to the same image buffers 22-1 to 22-n.

Upon receipt of the output of the image composing section 2, the image output section 3 retains the watermarked image and then outputs it by displaying on a display screen or printing using a printer.

Thus the image composing section 2 synthesizes or composes a composite image in which the colors used in the image inputted by the image input section 1 are replaced with the digital-watermarked textures of the data base section 5 as designated by the color conversion table section 4, and the composite image is outputted from the image output section 3. As a result, it is possible to effectively make a digital watermark even in an object image of few colors.

As an alternative, the image composing section 2 synthesizes or composes a composite image in which the colors used in the image inputted by the image input section 1 are replaced with the corresponding textures, which are read from the database section 6 in accordance with the designation of the color conversion table section 4 and in each of which a digital watermark is made by the digital watermarking section 7, and then the image output section 3 outputs the composite image. Accordingly it is possible to effectively make a digital watermark even in an input image of few colors.

As another alternative, the digital watermarking section 8 makes a digital watermark in a composite image in which the colors used in the image inputted by the image input section 1 are replaced with the texture read from the database section 6 in accordance with the designation of the color conversion table section 4 by the image composing section 2, and then the watermarked composite image is outputted from the image output section 3. As a result, it is possible to effectively make a digital watermark even in an input image of few colors.

As a further alternative, the image composing section 2 replaces the colors used in the image inputted by the image input section 1 with the textures which are read from the database section 6 in accordance with the designation of the color conversion table section 4 and in which a digital watermark is made, and then the resulting composite image is outputted. As a result, it is possible to effectively make a digital watermark even in an input image of few colors.

In other words, the image input section 1 extends the luminance level or depth of number of colors even in an input image of few colors to obtain an object image in which a digital watermark can be made at an adequate invisible level and, at the same time, the image composing section 2 not only simply extend the depth of the image format of the resulting image but also transforms the same color region of the original image into a region having specified textures. At that time, the specified textures have such a pattern that it is difficult to reproduce the original image by requantization of colors, thus improving the resistance to requantizing colors.

These textures are characterized in that many colors should be used or their luminance level should vary over a wide range. With the thus characterized textures, it is possible to make a digital watermark in an input image of few colors and also to improve the degree of resistance to deleting a digital watermark by requantization of colors.

According to the digital watermarking system of the present invention, since a composite image is synthesized or composed by replacing the colors used in an original image with a texture pattern which is previously coordinated with the colors and in which a digital watermark is made, it is possible to effectively make a digital watermark even in an original image of few colors.

It is thus apparent that the present invention should by no means be limited to the illustrated embodiments and various modifications and changes may be suggested without departing from the scope and spirit of the invention.

Finally, the present application claims the priority of Japanese Patent Application No. Hei9-160772 filed on Jun. 18, 1997, which is herein incorporated by reference.

What is claimed is:

1. A digital watermarking system for making a digital watermark in an input image, comprising:
   a texture database previously containing a plurality of texture patterns in each of which the digital water mark is previously made;
   a color conversion table in which information for coordinating original colors of the input image with said texture patterns is previously registered;
   means for composing, based on contents of said textured base and of said color conversion table, a watermarked image in which the original colors of the input image are replaced with said corresponding texture patterns; and
   outputting means for retaining said watermarked image received from said composing means and outputting said watermarked image.

2. A digital watermarking system according to claim 1, wherein said composing means includes a plurality of image buffers one for holding each of said texture patterns corresponding to a respective one of the original colors used in the input image, means for detecting the original colors of the input image one for each pixel of the input image, and means for reading, from said image buffers corresponding to the original colors detected by said detecting means, the corresponding pixels and for replacing the original colors with the corresponding texture patterns.

3. A digital watermarking system according to claim 1, further comprising means for inputting the input image in which the digital watermark is to be made, said inputting means capable of transforming or extending the color data of the input image in level of luminance or in number of colors.

4. A digital watermarking system according to claim 3, wherein the data of the format used in said system is 3-bit color data of RGB (red, green and blue) to be transformed or extended into total 24-bit data composed of 8-bit data for each of said red, green and blue color data.

5. A digital watermarking system according to claim 2, wherein said detecting means discriminates the number of the pixels of the input image as an image size and transfers said image size to said reading means.

6. A digital watermarking system according to claim 5, wherein, if said image size of the input image is not larger than the size of said textures registered in said color conversion table, said reading means repeatedly copies said textures with respect to the same dimension.

7. A digital watermarking system according to claim 6, wherein, if said image size of the input image is smaller than said textures registered in said color conversion table, said reading means copies part of said texture by a necessary length from said left or upper end of said texture.

8. A digital watermarking system for making a digital watermark in an input image, comprising:
   a texture database previously containing a plurality of textured patterns;
   a color conversion table in which information for coordinating colors of the input image with said texture patterns is previously registered;
   watermarking means for making the digital watermark in each of said texture patterns received from said texture database;
   means for composing, based on contents of said color conversion table and an output of said watermarking means, a watermarked image in which the original colors of the input image are replaced with said corresponding watermarked texture patterns; and
   outputting means for retaining said watermarked image received from said composing means and outputting said watermarked image.

9. A digital watermarking system according to claim 8, wherein said composing means includes a plurality of image buffers one for holding each of said texture patterns corresponding to a respective one of the original colors used in the input image, means for detecting the original colors of the input image one for each pixel of the input image, and means for reading, from said image buffers corresponding to the original colors detected by said detecting means, the corresponding pixels and for replacing the original colors with said corresponding watermarked texture patterns.

10. A digital watermarking system according to claim 8, further comprising means for inputting the input image in which the digital watermark is to be made, said inputting means capable of transforming or extending the color data of the input image in level of luminance or in number of colors.

11. A digital watermarking system according to claim 10, wherein the data of the format used in said system is 3-bit color data of RGB (red, green and blue) to be transformed or extended into total 24-bit data composed of 8-bit data for each of said red, green and blue color data.

12. A digital watermarking system according to claim 9, wherein said detecting means discriminates the number of the pixels of the input image as an image size and transfers said image size to said reading means.

13. A digital watermarking system according to claim 12, wherein, if said image size of the input image is not larger than the size of said textures registered in said color conversion table, said reading means repeatedly copies said textures with respect to the same dimension.

14. A digital watermarking system according to claim 12, wherein, if said image size of the input image is smaller than said textures registered in said color conversion table, said reading means copies part of said texture by a necessary length from said left or upper end of said texture.

15. A digital watermarking system for making a digital watermark in an input image, comprising:
   a texture database previously containing a plurality of texture patterns;
   a color conversion table in which information for coordinating original colors used in the input image with said texture patterns is previously registered;
   means for composing, based on contents of said texture database and of said color conversion table, a composite image in which the original colors of the input image are replaced with said corresponding texture patterns;
   watermarking means for making a digital watermark in said image to be outputted from said composing means; and
   outputting means for retaining said image in which the watermark is made by said watermarking means and for outputting such watermarked image.

16. A digital watermarking system according to claim 15, wherein said composing means includes a plurality of image buffers one for holding each of said texture patterns corresponding to a respective one of the original colors of the input image, means for detecting the original colors of the input image one for each pixel of the input image, and for and means for reading, from said image buffers corresponding to the original colors detected by said detecting means, the corresponding pixels and for replacing the original colors with the corresponding texture patterns.

17. A digital watermarking system according to claim 15, further comprising means for inputting the input image in which the digital watermark is to be made, said inputting means capable of transforming or extending the color data of the input image in or in number of colors.

18. A digital watermarking system according to claim 17, wherein the data of the format used in said system is 3-bit color data of RGB (red, green and blue) to be transformed or extended into total 24-bit data composed of 8-bit data for each of said red, green and blue color data.

19. A digital watermarking system according to claim 16, wherein said detecting means discriminates the number of the pixels of the input image as an image size and transfers said image size to said reading means.

20. A digital watermarking system according to claim 19, wherein, if said image size of the input image is not larger than the size of said textures registered in said color conversion table, said reading means repeatedly copies said textures with respect to the same dimension.

21. A digital watermarking system according to claim 19, wherein, if said image size of the input image is smaller than said textures registered in said color conversion table, said reading means copies part of said texture by a necessary length from said left or upper end of said texture.

22. A digital watermarking system for making a digital watermark in an input image, comprising:

(a) a texture database previously containing a plurality of texture patterns;

(b) a color conversion table in which information for coordinating original colors used in the input image with said texture patterns is previously registered;

(c) a plurality of image buffers one for holding each of said texture patterns corresponding to a respective one of the original colors of the input image;

(d) watermarking means for making the digital watermark in each of said texture patterns held respectively by said image buffers;

(e) means for detecting the original colors of the input image one for each pixel of the input image;

(f) composing means for reading, from said image buffers corresponding to the original colors detected one for each pixel of the input image by said detecting means and for holding said watermarked texture patterns, the corresponding pixels and for composing a composite image in which the original colors of the input image are replaced with the corresponding texture patterns; and (g) outputting means for retaining said image outputted from said composing means and for outputting said composite image.

* * * * *